United States Patent
Barniak, Jr.

(10) Patent No.: US 6,892,896 B2
(45) Date of Patent: May 17, 2005

(54) STOVETOP GRID FRAME RECEPTACLE OF DISPOSABLE ALUMINUM FOIL COOKING LINERS

(76) Inventor: Thomas John Barniak, Jr., 6011 Lance Rd., Medina, OH (US) 44256

( * ) Notice: Subject to any disclaimer, the term of this patent is extended or adjusted under 35 U.S.C. 154(b) by 94 days.

(21) Appl. No.: 10/342,527

(22) Filed: Jan. 16, 2003

(65) Prior Publication Data

US 2003/0141308 A1 Jul. 31, 2003

Related U.S. Application Data

(60) Provisional application No. 60/351,407, filed on Jan. 28, 2002.

(51) Int. Cl.[7] .................................................. B65D 21/02
(52) U.S. Cl. ........................ 220/573.4; 220/573.1; 220/23.91
(58) Field of Search ......................... 220/573.4, 491, 220/573.1, 485, 495, 494, 23.91, 23.87, 23.89, 23.86, 23.83, 495.03, 9.4, 737, 743, 756, 912, 668

(56) References Cited

U.S. PATENT DOCUMENTS

| 2,732,096 | A | * | 1/1956 | Siciliano | 220/769 |
| 2,832,500 | A | * | 4/1958 | Beebe | 220/491 |
| 4,164,174 | A | * | 8/1979 | Wallsten | 99/415 |
| 4,717,038 | A | | 1/1988 | Anders | 220/94 |
| 4,817,812 | A | | 4/1989 | Sarnoff | 220/85 |
| 4,971,216 | A | | 11/1990 | Fortune | 220/94 |
| 5,323,693 | A | | 6/1994 | Collard | 99/425 |
| 5,503,062 | A | | 4/1996 | Buff, IV | 99/426 |
| 6,237,803 | B1 | | 5/2001 | Sarnoff et al. | 220/743 |

* cited by examiner

Primary Examiner—Stephen Castellano

(57) ABSTRACT

An assembly for the cooking of food on the surface element burners of any range or stove consisting of a circumferential skeletal metal frame with handhold wherein the interior repository capacity formed by the skeletal frame therein serves as a receptacle area to a disposable aluminum foil cooking liner or pan of a corresponding size.

6 Claims, 2 Drawing Sheets

STOVETOP GRID FRAME RECEPTACLE OF DISPOSABLE ALUMINUM FOIL COOKING LINERS

CROSS-REFERENCE TO RELATED APPLICATION

This application is entitled to the benefit of Provisional Patent Application Ser. No. 60/351,407 filed Jan. 28, 2002.

BACKROUND

1. Field of Invention

The present invention generally relates to a metal support structure used in conjunction with a disposable aluminum foil cooking liner or pan in a food preparation function.

2. Description of Prior Art

Disposable aluminum foil pans are widely used for baking and roasting food dishes in many food preparation scenarios in a typical kitchen. The aluminum sheet material that they are stamped from conducts and distributes heat quickly and are so economical that they can be disposed of after use. Some of these aluminum pans are also reinforced with stamped ribs integrated in their side and end walls for additional strength. A variety of inner and outer metal support racks in tandem with foil pans are available in the public domain. These racks add even more structural integrity to an aluminum foil roasting pan. Some examples of these types of embodiments are disclosed in U.S. Pat. Nos. 6,237,803; 5,503,062; 4,971,216; 4,817,812; and 4,717,038. However, all of these embodiments are designed for use in an enclosed oven in a roasting or baking food preparation scenario. Their size, heavy construction, large rectangular or oval shape and their specifications herein disclosed are indicative of assemblies that are designed to be used for large quantities or a large item of food to be roasted or baked in an oven at a preset cooking temperature for a defined amount of time. Also, in U.S. Pat. No. 5,323,693 a frying pan insert in combination with a specifically designed flying pan is disclosed but its purpose is for excess fat and grease drainage in a quest for low-fat cooking. It should be duly stated that the aforementioned patents are not related to an improvement in disposable stovetop cooking such as will be disclosed in the present invention.

SUMMARY OF THE INVENTION

Specifically, the present invention introduces a new improved method and option in the art of range or stovetop cooking and food preparation in the typical residential or commercial kitchen. The present invention offers a viable alternative to the food preparer when cleaning or scrubbing of the solid surface stovetop pan to be used in the cooking function that is to be performed is not a perceivable option, whether because of the restraints of time or the characteristics of the food to be prepared in and of itself.

The present invention provides a lightweight skeletal metal framework of sufficient circumference and depth to function as a repository to a disposable aluminum foil cooking liner or pan of a corresponding circumference and depth. The assembly is then used as a cooking utensil on any common range or stove surface heating element just as a solid surface cooking pan would be used.

The framework consists of an open circular planar metal frame of a predetermined circumference attached by metal sidewall grid or wire members that extend downwardly and inwardly at equal distances to a bend point wherein the grid members extend in a planar radial fashion to a common fastening midpoint thereby creating a flat skeletal grid frame bottom parallel and equidistant from its upper planar circumferal frame. The sides and bottom of the grid frame receptacle will contain a sufficient number of sidewall and bottom grid or wire members to functionally rest on any stovetop surface heating element.

The correspondingly sized disposable aluminum foil cooking liner will have a semi-rigid material strip of a predetermined size integrated at a point on its top periphery circumference to function as a locking in mechanism to its corresponding grid frame receptacle. It will simply be a matter of hand-twisting the semi-rigid strip around a grid or wire bar integrated at a point on the upper circumferal frame, preferably at the preformed handle. This will prevent the cooking liner from moving or spinning around in its grid frame receptacle when the handle is gripped and the food item being cooked is stirred or turned in the cooking liner.

It is an objective of the present invention to provide an improvement in the art of stovetop cooking that is both simplistic in its nature of use and is affordable to manufacture and introduce to the public at large.

It is a further objective of the present invention to provide a cooking utensil alternative to the solid surface cookware that is used for range or stovetop cooking.

It is also an objective of the present invention to provide a cooking method that requires a limited amount of post-cooking cleanup of the cooking utensil.

Yet another objective of the present invention is to provide an infinite number of circumferences and depths of the grid frame receptacles and their corresponding disposable aluminum foil cooking liners.

Finally another objective of the present invention is to provide a grid frame receptacle of sufficient metal composition and gauge to perform an indefinite number of cooking operations.

Further objects and advantages of the present invention will be apparent in the following description and drawings.

BRIEF DESCRIPTION OF THE DRAWINGS

For the purpose of illustration and a complete understanding of the present invention, there is shown in the drawings an embodiment which is presently preferred. It should not be construed, however, that the present invention is to be limited to the arrangements shown in the drawings set forth and that a different configuration of certain instrumentalities will secede from the nature and scope of the invention.

DESCRIPTION AND OPERATION OF THE ILLUSTRATIVE EMBODIMENT

Figure 1:
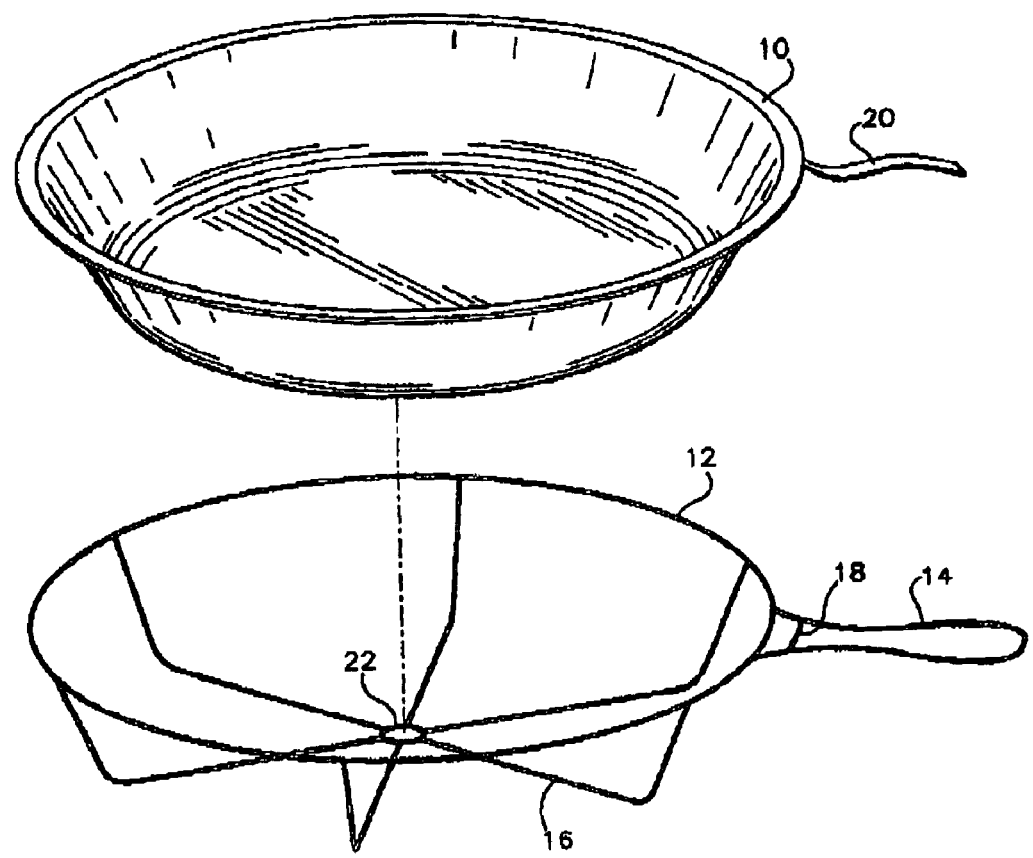
FIG. 1 is an isometric view of a grid frame receptacle and its corresponding aluminum foil cooking liner or pan shown as a stovetop skillet or frypan variation of the embodiment.
Figure 2:
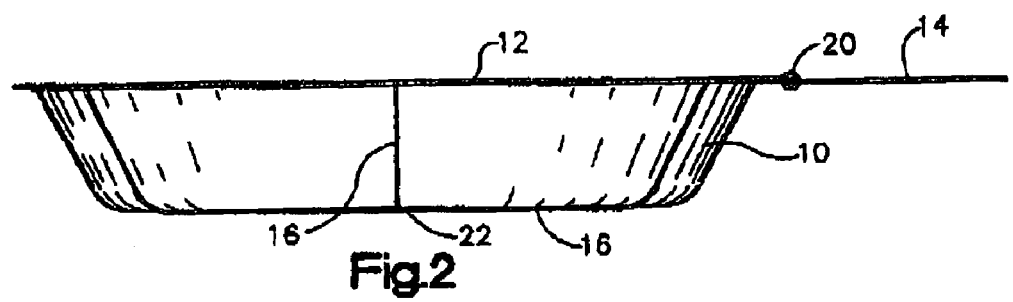
FIG. 2 is a side view of FIG. 1 illustrating the grid frame receptacle with its corresponding aluminum foil cooking liner installed and ready for a cooking function.
Figure 3:
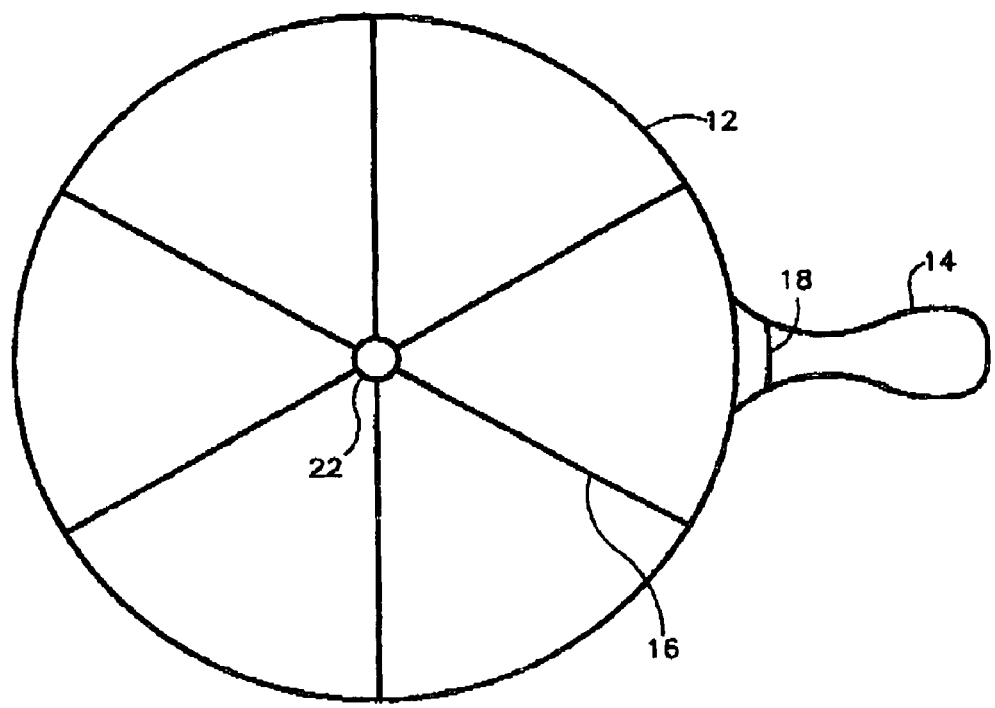
FIG. 3 is a top view of the grid frame receptacle shown in FIGS. 1 and 2 illustrating a possible configuration of the side and bottom grid or wire frame assembly and also the grid frame bridge bar or wire integrated across the plane of the handhold or handle area.
Figure 4:
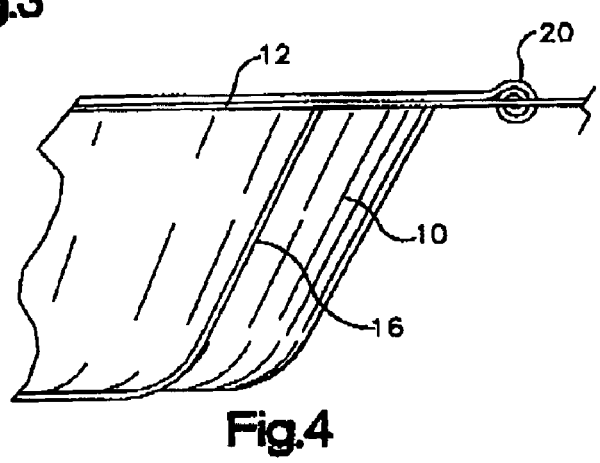
FIG. 4 is an enlarged fragmentary view of the aluminum foil cooking liner in its corresponding grid frame receptacle.

Referring to the drawings, an aluminum foil cooking liner 10 of a predetermined circumference and depth is illustrated in a preposition above its corresponding grid frame receptacle. The grid frame receptacle shown in all the drawing figures is of the typical surface skillet or frypan variation with its formed upper planar metal circumferal frame 12 and a preformed handhold or handle area 14. For an illustrative example, the skillet grid frame receptacle is shown with six side and bottom metal grid or wire members 16 predisposed at equal fastening tangents on the circumferal metal frame 12 and terminating at the common radial centerpoint 22 of the planar grid frame bottom. A metal grid frame bridge member 18 is illustrated at the handhold or handle area 14 as an example of a "locking in" or fastening location for the aluminum foil cooking liner 10.

The aluminum foil cooking liner 10 is placed by hand in the repository space formed for its specific circumference and depth in the defined grid frame receptacle of a corresponding circumference and depth. The preformed flat bottom of the aluminum foil cooking liner 10 will set upon the upper surface of the side and bottom metal grid members 16 and its preformed peripheral top lip will envelope and set upon the upper surface of the circumferential metal frame 12 therein transposing structural integrity to the aluminum foil cooking liner 10. The aluminum foil cooking liner 10 is set in its corresponding grid frame receptacle so that the semi-rigid material strip 20 that is integrated at a point on the peripheral top planar lip or rim of the aluminum foil cooking liner 10 is juxtaposed to the metal grid frame bridge member 18 integrated at the handhold or handle area 14. At this point the semi-rigid material strip 18 is hand-wrapped or wound around the metal grid frame bridge member 18 a predetermined number of times thereby creating a fixed position of the aluminum foil cooking liner 10 in the grid frame receptacle. The transfixing of the aluminum foil cooking liner 10 to the grid frame receptacle accomplishes a stationary cooking utensil when the handhold or handle area 14 is gripped by the food preparer wherein stirring or turning of the food dish being cooked is warranted or desired. The semi-rigid material strip 20 is hand unwound from the metal grid frame bridge member 18 when the aluminum foil cooking liner 10 is to be removed from its grid frame receptacle, whether for the purpose of cold storage of the remaining food dish or the disposal of the used pan itself. The grid frame receptacle is now empty and another aluminum foil cooking liner 10 can be predisposed in its repository and another stovetop cooking operation is ready to commence.

The metal composition of the grid frame receptacle will be of a type used as an industry standard and will not be limited to a certain alloy, mixture of alloys, or a surface coated or chromed metal type. All connections or fabrications of the components of the grid frame receptacle, including but not limited to the sidewall connections at the circumferential metal frame 12, the terminal radial centerpoint 22 of the bottom grid frame members, or the grid frame bridge member 18 will be accomplished in an industrial standard method of connecting metal alloys, but will not be limited to brazing, welding, soldering, or forging. The gauge, shape, or dimensional size of the skeletal metal frame used in the fabrication of an infinite number of possible circumferences and depths of the stovetop grid frame receptacle shall not be limited and any derivative of these fundamentals shall not deter from the spirit and scope of the present invention.

REFERENCE NUMERALS IN DRAWINGS

10 Aluminum foil cooking liner or pan
12 Circumferential (circumferal) metal grid mainframe
14 Handhold or handle area
16 Side and bottom metal grid members (six shown for illustrative purpose)
18 Metal grid frame bridge (transom) member
20 Semi-rigid material strip (integrated)
22 Bottom radial centerpoint (termination)

Ramifications and Scope

The present invention will simplify the necessary function that stovetop element food preparation always relegates itself to after the cooking and heating of the food dish has been completed using standard solid surface cookware. Exactly stating, by using the present invention in a stovetop element cooking operation instead of solid cookware, the process of washing and sanitizing the cooking utensil that would be necessary and evident in a standard solid cookware use scenario, is eliminated or reduced greatly. The fact that the aluminum foil cooking liners are disposable dictate that reality. Since the food dish being prepared never touches the grid frame receptacle, except in a spill or splatter action, a simple damp cloth or sponge wiping is all it will ever need to prepare it for the next cooking assignment. If washing and sanitizing is desired, the grid frame receptacle contains so little hard surface area, this task will easily be accomplished within the scope of a minimum of time and effort.

Although the typical residential home kitchen will benefit significantly from the simplification in the art of stovetop food preparation that the present invention provides, the commercial kitchen will also be enhanced by its use and its inherent cumulative performance in streamlining and impelling the cooking operation forward. Since an infinite number of circumferences, gauges, and depths of the grid frame receptacles have herein been disclosed, the larger rangetop surface heating elements that are used on commercial ranges or stoves can be matched to a heavier-duty grid frame receptacle fabricated especially for the commercial kitchen and the high volume of cooking operations that are congruous of it.

As an illustrative example of the aforementioned standard would be a typical restaurant kitchen area employing several commercial ranges or stoves for surface element cooking of several food dishes being prepared simultaneously. A multitude of grid frame receptacles with segregated or compartmentalized aluminum foil cooking liners would allow for the cooking of unrelated food dishes to be heated and cooked simultaneously on the same surface heating element. Since the aluminum foil cooking liner is a stamped or molded product, many gauges and configurations of its interior cooking receptacle area will be possible and probable. Accordingly, not only will this substantially increase the nominal completed food dish output of that commercial range being used, but will also result in the availability of different food dish commands to be instigated at a faster cooking pace because of the lack of need to wash and sanitize the surface cooking utensil. Increased output, reduced cleaning and sanitizing costs and the elimination of the initial costs to acquire solid surface cookware, therefore resulting in lower overhead costs cannot be understated or dismissed as nonfactorial in the operation of the commercial kitchen.

The Outdoor Recreation and Camping Industry will also be improved by the introduction of the present invention, wherein campfire scorch-blackened cooking utensils would no longer have to be washed and sanitized. This fact will allow for a cleaner and more efficient campsite, especially in a primitive campsite scenario when water might not be readily available or in limited supply. It should also be duly noted that a skillet or other functional pan can be improvised in a campfire cooking operation if desired by hand-wrapping and tucking sheet aluminum foil from a roll around the inside receptacle area of a grid frame receptacle. Two or three layers of disposable aluminum sheet foil applied to a grid frame receptacle will function very efficiently as a cooking utensil, either used on a grille suspended over the cooking fire or placed directly on the hot embers or charcoal. It will simply be a matter of disposing of the spent aluminum foil in a reasonable manner or wrapping any remains of the food dish just prepared for storage and consumption at a later date.

Finally, the economic feasibility factor will be a very important feature of the present invention and can be best described and disclosed by the following two statements;

1. The inexpensive cost to manufacture and fabricate the present invention in a mass produced manner because of its simplicity and composition.
2. The potential ability of the mass public to acquire the present invention because of the inexpensive manufacturing and fabrication cost and for what it accomplishes.

Therein set forth are just some of the ramifications of the present invention in potential use as an alternative cooking utensil can accomplish in the cooking scenarios described. Its scope and other possible advantages should not be limited or confined to only the aforementioned examples in this specification.

I claim:
1. A food cooking assembly comprising:
   a metal frame containing a plurality of metal grid members, the grid members extend downwardly and inwardly and collectively form an upper circumferential rim and a planar base parallel to the upper circumferential rim, an elongated handle is integrally connected to the upper rim and extends radially upwardly from the upper rim, a metal bridge member extends generally perpendicularly to and between two opposed elongated portions of the handle, the elongated portions extending longitudinally in alignment with the length of the handle;
   a removable, thin-walled aluminum cooking liner of correlative size to fit the interior of the frame, the liner contains an outermost rim and a base, an elongated ribbon of material is integrally attached to the outermost rim of the liner and is removable attached to the bridge member by a plurality of windings of the ribbon around the bridge member.
2. The food cooking assembly of claim 1, further comprising a heating element for a stove or range, the planar base of the metal frame set securely and level on said heating element.
3. The food cooking assembly of claim 1, wherein the ribbon is stamped into the outermost rim of the liner.
4. The food cooking assembly of claim 1, wherein the material of the ribbon is flexible enough to wind by hand.
5. The food cooking assembly of claim 1, wherein the liner is stamped and is of a thickness to be suitable for cooking and for disposal after use.
6. The food cooking assembly of claim 1, wherein the outermost rim of the liner has a bottom surface that rests securely on the top surface of the upper rim of the frame and the base of the liner has a bottom surface resting upon and supported by the top surface of the planar base of the frame.

* * * * *